Patented Apr. 26, 1927.

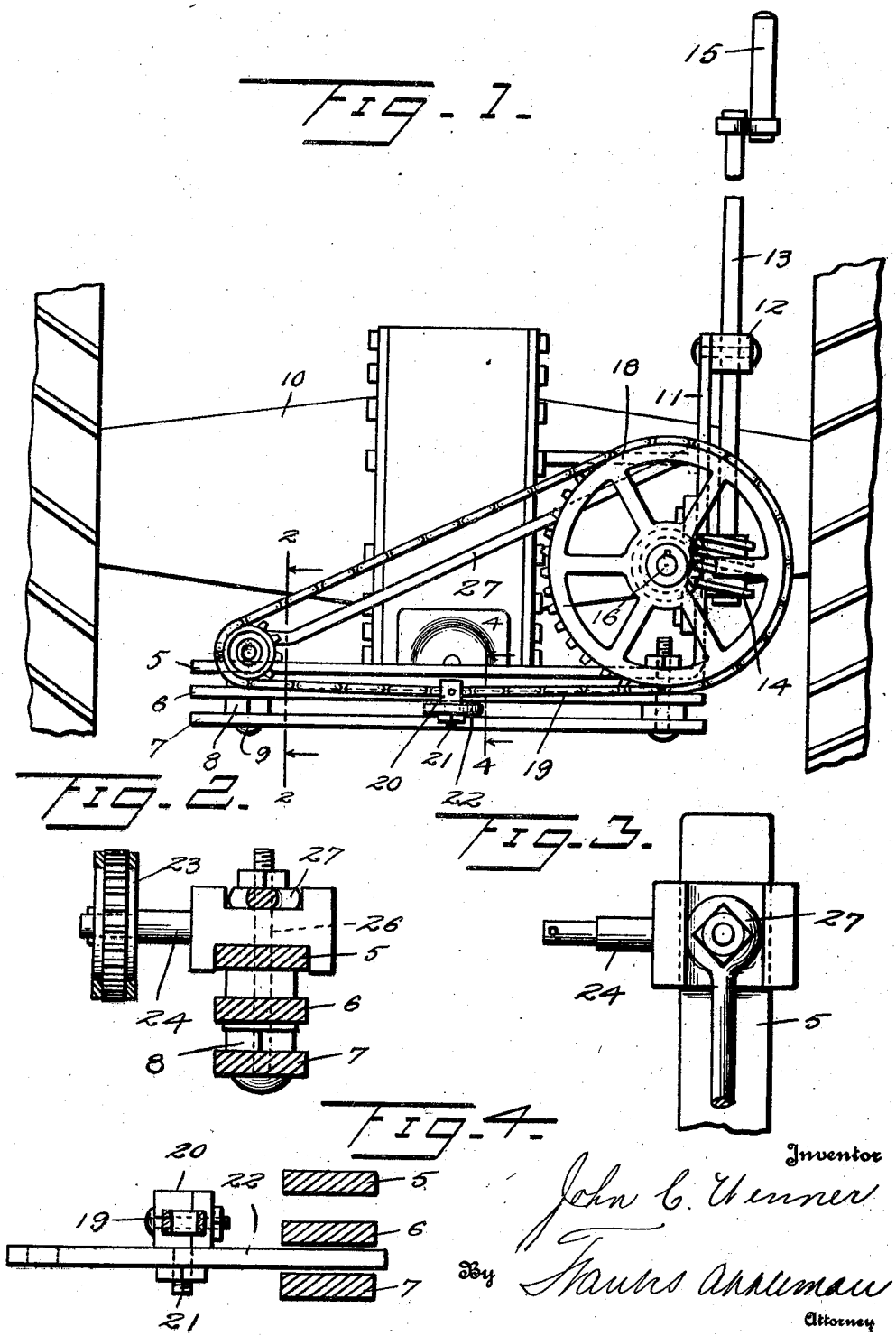

1,626,441

UNITED STATES PATENT OFFICE.

JOHN C. WENNER, OF CARROLLTON, OHIO.

TRACTOR HITCH.

Application filed August 6, 1925. Serial No. 48,614.

This invention relates to tractor hitches, and has for an object the provision of novel means for moving and retaining in different positions of adjustment a draw-bar whose inner end is pivotally connected to the tractor in a manner which will permit the said draw-bar to oscillate in a horizontal plane, while at the same time the said draw-bar may have slight vertical oscillatable movement, when such movement is desirable.

A further object of this invention is to produce means for moving the outer end of the draw-bar for swinging it on its pivot, said means being effective to hold the draw-bar against movement incident to strain produced by the movement of the tractor with relation to the load, or vice versa, the said device, however, being manually operatable for the expeditious change of position of the parts; and the said invention further contemplates the provision of means of the character indicated which will not readily become fouled by deposits or impaired by use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of an end of a tractor showing a device embodying the invention applied thereto;

Figure 2 illustrates a sectional view on the line 2—2 of Fig. 1;

Figure 3 illustrates a plan view of the mounting for one of the sprocket wheels; and Figure 4 illustrates a sectional view on the line 4—4 of Fig. 1, omitting parts on the opposite side of the draw-bar.

In these drawings, the present embodiment of the invention is illustrated as comprising a transversely disposed support and guide for parts of the operating mechanism and the draw-bar. As here illustrated, there are a plurality of superimposed plates 5, 6 and 7 held in spaced relation to one another by collars 8 to which bolts 9 are applied, the said bolts extending through apertures of the plates and the collars and secured in conventional manner.

The combined support and guide may be suspended from the tractor 10 by suitable arms or brackets which need not, it is thought, be described in detail.

In the present invention, the plate 5 has an upstanding portion 11 which may be said to constitute a standard which carries journal bearings such as 12, in which a vertically disposed shaft 13 is journaled. The shaft is provided with a worm 14 and the shaft may be manually rotated in suitable manner, as by a crank 15.

An approximately horizontally disposed shaft 16 is suitably journaled in supports, and the standard 11 aids in holding the supports for the shaft 16, the said shaft being provided with a worm wheel 17 engaged by the worm so that as the worm is rotated in opposite directions, the shaft 16 will likewise be oppositely rotated.

A relatively large sprocket wheel 18 is mounted on the shaft 16 and it is engaged by a sprocket chain 19. The periphery of the sprocket wheel is approximately in line with the space between the plates 5 and 6, and the said sprocket chain is secured to a block 20 that has a shank 21 fastened in the draw-bar 22, it being shown that the draw-bar projects through and may be oscillated in the space between the plates 6 and 7.

A sprocket sheave 23 is rotatably mounted on a stub shaft 24 projecting from a base 25, and the said base is secured on the upper surface of the plate 5 near its end and the said base has an aperture 26 which coincides with the apertures in the plates through which one of the bolts 9 extends, and the said bolt projects through the base and serves to anchor a brace 27 to the structure at the end thereof having the base 25. It is shown that the sprocket chain 19 operates over the sheave and the brace 27 extends from the base to the standard 11 so that the structure is strong and comparatively unyielding.

From an inspection of the drawing, it will be apparent that when the crank is turned in one direction or the other, the wheel 18 will be rotated, and therefore, the sprocket chain will be moved to swing the draw-bar from the central position which it is shown as occupying in Fig. 1 to one side or the other, according to the direction of rotation of the wheel, and that movement in the opposite direction will likewise cause the draw-bar to move in order that it will be properly positioned for coupling to the load of the tractor.

I claim:

In a tractor hitch, a plurality of guiding plates in superimposed relation, one of said plates having an upwardly projecting portion forming a standard, a shaft rotatably mounted vertically of the said standard, a worm on said shaft, a shaft rotatably mounted approximately horizontally on said standard, a worm wheel thereon meshing with the aforesaid worm, a sprocket wheel on the said shaft, a draw-bar adapted to be pivotally connected to a tractor and being guided near its outer end with relation to the plates, a block secured to the draw-bar, a chain operating over the aforesaid sprocket wheel connected to the said block, a sprocket sheave, a member on which the said sheave is rotatably mounted, a base carrying said member anchored on one of the aforesaid plates, the said sheave constituting a guide and engaging member for the sprocket chain, and a brace connected to the base and the standard and suitably anchored.

JOHN C. WENNER.